US012173218B2

(12) United States Patent
Nakamura et al.

(10) Patent No.: US 12,173,218 B2
(45) Date of Patent: Dec. 24, 2024

(54) PHOSPHATE AMINE SALT COMPOSITION, PHOSPHATE AMINE SALT FLAME RETARDANT COMPOSITION, FLAME RETARDANT SYNTHETIC RESIN COMPOSITION CONTAINING SAME, AND MOLDED ARTICLE OF FLAME RETARDANT SYNTHETIC RESIN COMPOSITION

(71) Applicant: ADEKA CORPORATION, Tokyo (JP)

(72) Inventors: Michio Nakamura, Tokyo (JP); Yutaka Yonezawa, Tokyo (JP); Yuri Yokota, Tokyo (JP); Kohei Omori, Tokyo (JP); Genta Kokura, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 1016 days.

(21) Appl. No.: 17/251,528

(22) PCT Filed: Jun. 12, 2019

(86) PCT No.: PCT/JP2019/023308
§ 371 (c)(1),
(2) Date: Dec. 11, 2020

(87) PCT Pub. No.: WO2019/240181
PCT Pub. Date: Dec. 19, 2019

(65) Prior Publication Data
US 2021/0246374 A1 Aug. 12, 2021

(30) Foreign Application Priority Data

Jun. 13, 2018 (JP) .................................. 2018-113091

(51) Int. Cl.
C09K 21/12 (2006.01)
C08K 3/32 (2006.01)
C08L 23/02 (2006.01)

(52) U.S. Cl.
CPC ............... C09K 21/12 (2013.01); C08K 3/32 (2013.01); C08L 23/025 (2013.01); C08K 2003/321 (2013.01)

(58) Field of Classification Search
None
See application file for complete search history.

(56) References Cited

U.S. PATENT DOCUMENTS

| 2003/0088000 A1 | 5/2003 | Kimura et al. |
| 2006/0167256 A1 | 7/2006 | Kimura et al. |
| 2010/0227952 A1 | 9/2010 | Futterer et al. |
| 2010/0298474 A1 | 11/2010 | Futterer et al. |
| 2012/0190779 A1 | 7/2012 | Okita et al. |
| 2013/0294994 A1 | 11/2013 | Kamimoto et al. |
| 2015/0329698 A1 | 11/2015 | Murata et al. |
| 2015/0353513 A1 | 12/2015 | Harada et al. |
| 2016/0152798 A1 | 6/2016 | Kamimoto et al. |
| 2019/0040245 A1 | 2/2019 | Sakurai et al. |

FOREIGN PATENT DOCUMENTS

| CN | 101765629 A | 6/2010 |
| CN | 103079999 A | 5/2013 |
| CN | 104159977 A | 11/2014 |
| CN | 105017563 A | 11/2015 |
| CN | 105837855 A | 8/2016 |
| JP | 8-176343 A | 7/1996 |
| JP | 8-208959 A | 8/1997 |
| JP | 2001-26597 A | 1/2001 |
| JP | 2003-26935 A | 1/2003 |
| JP | 2003-221389 A | 8/2003 |
| JP | 2017-31351 A | 2/2017 |
| WO | WO 2005/037806 A1 | 4/2005 |
| WO | WO 2011/021498 A1 | 2/2011 |
| WO | WO 2014/132814 A1 | 9/2014 |
| WO | WO 2015/025658 A1 | 2/2015 |
| WO | WO 2017/179289 A1 | 10/2017 |

OTHER PUBLICATIONS

International Search Report, issued in PCT/JP2019/023308, dated Aug. 20, 2019.
Written Opinion of the International Searching Authority, issued in PCT/JP2019/023308, dated Aug. 20, 2019.

Primary Examiner — Tanisha Diggs
(74) Attorney, Agent, or Firm — Birch, Stewart, Kolasch & Birch, LLP

(57) ABSTRACT

Provided are: a phosphate amine salt composition which can be used as a flame retardant that is capable of imparting excellent flame retardancy and weather resistance to synthetic resins without a risk of corroding a processing machine; a phosphate amine salt flame retardant composition; a flame-retardant synthetic resin composition containing the same; and a molded article thereof. The phosphate amine salt composition contains at least one phosphate amine salt, and the ammonium cation content therein is 100 to 2,000 ppm by mass. An amine in the phosphate amine salt composition is preferably melamine or piperazine.

4 Claims, No Drawings

PHOSPHATE AMINE SALT COMPOSITION, PHOSPHATE AMINE SALT FLAME RETARDANT COMPOSITION, FLAME RETARDANT SYNTHETIC RESIN COMPOSITION CONTAINING SAME, AND MOLDED ARTICLE OF FLAME RETARDANT SYNTHETIC RESIN COMPOSITION

TECHNICAL FIELD

The present invention relates to a phosphate amine salt composition, a phosphate amine salt flame retardant composition, a flame-retardant synthetic resin composition containing the same, and a molded article thereof. More particularly, the present invention relates to: a phosphate amine salt composition which can be used as a flame retardant that is capable of imparting excellent flame retardancy and weather resistance to synthetic resins without a risk of corroding a processing machine; a phosphate amine salt flame retardant composition; a flame-retardant synthetic resin composition containing the same; and a molded article thereof.

BACKGROUND ART

Synthetic resins are, because of their excellent chemical and mechanical properties, widely used in building materials, automobile components, packaging materials, agricultural materials, housing materials of home electric appliances, toys, and the like. However, many of the synthetic resins are flammable; therefore, depending on the application, flame-proofing of such synthetic resins is indispensable. As a flame-proofing method, it is widely known to use one or a combination of halogen-based flame retardants, inorganic phosphorus-based flame retardants such as red phosphorus, organophosphorus-based flame retardants typified by triaryl phosphate compounds, metal hydroxides, and flame retardant aids such as antimony oxide and melamine compounds.

Halogen-based flame retardants, however, have a problem of generating a toxic gas upon combustion. Thus, attempts have been made to use a phosphorus-based flame retardant that does not cause such a problem. Particularly, phosphate-based flame retardants composed of ammonium polyphosphate or a salt formed by polyphosphoric acid and an amine have been used because of their excellent flame retardancy. For example, Patent Document 1 proposes a flame-retardant synthetic resin composition that contains ammonium polyphosphate. In addition, Patent Document 2 proposes a flame-retardant synthetic resin composition that contains melamine polyphosphate and piperazine polyphosphate.

RELATED ART DOCUMENTS

Patent Documents

[Patent Document 1] JPH08-176343A
[Patent Document 2] JP2003-26935A

SUMMARY OF THE INVENTION

Problems to be Solved by the Invention

Nevertheless, these phosphate-based flame retardants present a risk of corroding a processing machine during processing of a synthetic resin, although they can impart excellent flame retardancy to the synthetic resin. In addition, there is also a problem that the weather resistance of the resulting molded article is not necessarily sufficient.

In view of the above, an object of the present invention is to provide: a phosphate amine salt composition which can be used as a flame retardant that is capable of imparting excellent flame retardancy and weather resistance to synthetic resins without a risk of corroding a processing machine; a phosphate amine salt flame retardant composition; a flame-retardant synthetic resin composition containing the same; and a molded article thereof.

Means for Solving the Problems

The present inventors intensively studied to solve the above-described problems and consequently directed their focus to the ammonium cation content in a phosphate amine salt composition used as a flame retardant, thereby completing the present invention.

That is, the phosphate amine salt composition of the present invention is a phosphate amine salt composition containing at least one phosphate amine salt, the composition being characterized in that an ammonium cation content is 100 to 2,000 ppm by mass.

An amine in the phosphate amine salt composition of the present invention is preferably melamine or piperazine, and the phosphate amine salt composition of the present invention is more preferably a mixture of a phosphate amine salt composition (A) in which an amine of the above-described phosphate amine salt composition is melamine and a phosphate amine salt composition (B) in which an amine of the above-described phosphate amine salt composition is piperazine. Further, in the phosphate amine salt composition of the present invention, the content ratio of the phosphate amine salt composition (A) and the phosphate amine salt composition (B), (A)/(B), is preferably in a range of 20/80 to 80/20 in terms of mass ratio.

The phosphate amine salt flame retardant composition of the present invention is characterized by containing the phosphate amine salt composition of the present invention.

The flame-retardant synthetic resin composition of the present invention is characterized in that the phosphate amine salt flame retardant composition of the present invention is incorporated into a synthetic resin.

In the flame-retardant synthetic resin composition of the present invention, the synthetic resin is preferably a polyolefin-based resin.

The molded article of the present invention is characterized by being obtained from the flame-retardant synthetic resin composition of the present invention.

Effects of the Invention

According to the present invention, the following can be provided: a phosphate amine salt composition which can be used as a flame retardant that is capable of imparting excellent flame retardancy and weather resistance to synthetic resins without a risk of corroding a processing machine; a phosphate amine salt flame retardant composition; a flame-retardant synthetic resin composition containing the same; and a molded article thereof.

MODE FOR CARRYING OUT THE INVENTION

Embodiments of the present invention will now be described in detail.

First, the phosphate amine salt composition of the present invention will be described. The phosphate amine salt composition of the present invention means a composition which contains at least one phosphate amine salt and 100 to 2,000 ppm by mass of ammonium cation. In the phosphate amine salt composition of the present invention, the term "phosphate" as in "phosphate amine salt" is a general term for orthophosphate, pyrophosphate, and polyphosphate.

In the phosphate amine salt composition of the present invention, examples of the phosphate amine salt include orthophosphate amine salts, which are amine salts of orthophosphoric acid ($H_3PO_4$); pyrophosphate amine salts, which are amine salts of pyrophosphoric acid ($H_4P_2O_7$) in which two orthophosphoric acid molecules are condensed; polyphosphate amine salts, which are amine salts of polyphosphoric acid ($H_{n+2}P_nO_{3n+1}$, wherein n represents a positive integer of 3 or larger) in which three or more orthophosphoric acid molecules are condensed; and amine salts of metaphosphoric acid (($HPO_3)_m$, wherein m represents a positive integer), and one or more of these phosphate amine salts may be contained. The polyphosphoric acid mainly has a linear structure; however, it may contain a branched structure or have a cyclic structure. In the phosphate amine salt composition of the present invention, the phosphate amine salt may be constituted by any one of, or a mixture of two or more of the above-described phosphate amine salts. Further, the phosphate amine salt may be a normal salt, an acidic salt, or a basic salt. The amine of the phosphate amine salt may be a single amine, or a mixture of two or more amines, or a double salt.

Examples of the amine in the phosphate amine salt include alkylamines, aromatic amines, and heterocyclic amines. The amine may contain a hydroxy group. The phosphate amine salt may be constituted by any one of, or two or more of these amines. It is noted here that, in the phosphate amine salt composition of the present invention, ammonia is not included in the amine.

Examples of the alkylamines include monoalkylamines represented by $R^1NH_2$, dialkylamines represented by $R^1R^2NH$, trialkylamines represented by $R^1R^2R^3N$, and diamines represented by $[R^4R^5N(CH_2)_tNR^6R^7]$. $R^1$, $R^2$ and $R^3$, which are optionally the same or different, each represent a linear or branched alkyl group having 1 to 8 carbon atoms; $R^4$, $R^5$, $R^6$ and $R^7$, which are optionally the same or different, each represent a hydrogen atom or a linear or branched alkyl group having 1 to 8 carbon atoms; and t represents a positive integer, which is preferably 1 to 20.

Examples of the monoalkylamines include methylamine, ethylamine, propylamine, and isopropylamine. Examples of the dialkylamines include dimethylamine, methylethylamine, diethylamine, dipropylamine, methylpropylamine, and ethylpropylamine.

Examples of the trialkylamines include trimethylamine, dimethylethylamine, dimethylpropylamine, methyldiethylamine, methyldipropylamine, triethylamine, and tripropylamine.

Examples of the diamines represented by $[R^4R^5N(CH_2)_tNR^6R^7]$ include N,N,N,N-tetramethyldiaminomethane, ethylenediamine, N,N-dimethylethylenediamine, N,N-diethylethylenediamine, N,N-dimethylethylenediamine, N,N-diethylethylenediamine, N,N,N,N-tetramethylethylenediamine, N,N,N,N-diethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, and 1,10-diaminodecane.

Examples of the aromatic amines include aromatic monoamines, aromatic diamines, and aromatic triamines. Examples of the aromatic monoamines include aniline. Examples of the aromatic diamines include 1,2-diaminobenzene, 1,4-diaminobenzene, and 1,3-diaminobenzene. Examples of the aromatic triamines include 1,3,5-triaminobenzene.

Examples of the heterocyclic amines include those having 2 to 14 carbon atoms, which contain at least one nitrogen atom and/or at least one selected from a sulfur atom and an oxygen atom. Examples of such heterocyclic amines include aliphatic heterocyclic amines having 2 to 7 carbon atoms, 5-membered aromatic heterocyclic amines having 2 to 4 carbon atoms, 6-membered aromatic heterocyclic amines having 2 to 5 carbon atoms, and polycyclic aromatic heterocyclic amines having 5 to 12 carbon atoms.

Examples of the aliphatic heterocyclic compounds having 2 to 7 carbon atoms include piperidine, piperazine, morpholine, quinuclidine, pyrrolidine, azetidine, azetidin-2-one, and aziridine, among which compounds having a 4- to 9-membered ring are preferred, and compounds having a 6-membered ring are particularly preferred.

Examples of the 5-membered aromatic heterocyclic compounds having 2 to 4 carbon atoms include pyrrole, imidazole, pyrazole, oxazole, isoxazole, thiazole, and isothiazole.

Examples of the 6-membered aromatic heterocyclic amines having 2 to 5 carbon atoms include melamine, pyridine, pyrimidine, pyridazine, pyrazine, and 1,2,3-triazine.

Examples of the polycyclic aromatic heterocyclic amines having 5 to 12 carbon atoms include quinoline, isoquinoline, quinazoline, phthalazine, indole, benzimidazole, purine, acridine, and phenothiazine.

Specific examples of amines other than the above-described ones include: heterocyclic amines, such as acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine; and diamines, such as trans-2,5-dimethylpiperazine, 1,4-bis(2-aminoethyl)piperazine, and 1,4-bis(3-aminopropyl)piperazine.

When these amines have a hydroxy group, examples of such amines include monoalkylamines represented by $R^1NH_2$, dialkylamines represented by $R^1R^2NH$, and trialkylamines represented by $R^1R^2R^3N$, in which one or more hydrogen atoms in each alkyl is/are substituted with a hydroxy group(s), such as methanolamine, ethanolamine, dimethanolamine, diethanolamine, trimethanolamine, and triethanolamine.

The amine in the phosphate amine salt is preferably at least one selected from the group consisting of alkylamines, aromatic amines, heterocyclic amines, ethanolamine, diethanolamine, and diethylenetriamine, more preferably at least one selected from the group consisting of diethylamine, ethanolamine, diethanolamine, aniline, melamine, morpholine, ethylenediamine, piperazine, 1,2-diaminobenzene, 1,4-diaminobenzene, diethylenetriamine, methylamine, ethylamine, and dimethylamine. From the standpoints of inhibition of corrosion of a processing machine as well as weather resistance and flame retardancy, the amine is still more preferably melamine or piperazine, most preferably melamine.

In the phosphate amine salt composition of the present invention, the phosphate amine salt can be any combination of one or more of the above-described phosphoric acids and one or more of the above-described amines. For example, when the phosphoric acid is a combination of orthophosphoric acid and pyrophosphoric acid and the amine is a combination of piperazine and melamine, examples of the phosphate amine salt include piperazine orthophosphate, piperazine pyrophosphate, melamine orthophosphate, and melamine pyrophosphate, as well as double salts formed by orthophosphoric acid, piperazine and melamine, and double salts formed by pyrophosphoric acid, piperazine and melamine.

In the phosphate amine salt composition of the present invention, from the standpoints of inhibition of corrosion of a processing machine as well as weather resistance and flame retardancy, the phosphate amine salt contains preferably at least one selected from the group consisting of orthophosphate amine salts, pyrophosphate amine salts and polyphosphate amine salts, more preferably at least one selected from the group consisting of pyrophosphate amine salts and polyphosphate amine salts, still more preferably at least one pyrophosphate amine salt.

From the standpoints of inhibition of corrosion of a processing machine as well as weather resistance and flame retardancy, the ratio of a pyrophosphate amine salt in all phosphate amine salts is preferably 80% by mass to 100% by mass, more preferably 90% by mass to 100% by mass, still more preferably 95% by mass to 100% by mass, yet still more preferably 98% by mass to 100% by mass. The ratios of an orthophosphate amine salt, a pyrophosphate amine salt and a polyphosphate amine salt in all phosphate amine salts can be determined by ion chromatography or the like.

In the phosphate amine salt composition of the present invention, from the standpoints of inhibition of corrosion of a processing machine as well as weather resistance and flame retardancy, the phosphate amine salt is preferably melamine phosphate, more preferably contains at least one selected from the group consisting of a melamine orthophosphate, a melamine pyrophosphate and a melamine polyphosphate, still more preferably contains at least one selected from the group consisting of a melamine pyrophosphate and a melamine polyphosphate, yet still more preferably contains at least one melamine pyrophosphate. From the standpoints of inhibition of corrosion of a processing machine as well as weather resistance and flame retardancy, the melamine pyrophosphate is preferably dimelamine pyrophosphate in which the molar ratio of pyrophosphoric acid and melamine is 1:2.

As for the molar ratio of phosphoric acid and melamine in melamine phosphate, from the standpoints of inhibition of corrosion of a processing machine as well as weather resistance and flame retardancy, the ratio of melamine is preferably 0.8 to 1.2 mol, more preferably 0.9 to 1.1 mol, with respect to 1 mol of phosphorus atom of phosphoric acid.

Further, in the phosphate amine salt composition of the present invention, from the standpoints of inhibition of corrosion of a processing machine as well as weather resistance and flame retardancy, the phosphate amine salt is also preferably piperazine phosphate, more preferably contains at least one selected from the group consisting of a piperazine orthophosphate, a piperazine pyrophosphate and a piperazine polyphosphate, still more preferably contains at least one selected from the group consisting of a piperazine pyrophosphate and a piperazine polyphosphate, yet still more preferably contains at least one piperazine pyrophosphate. From the standpoints of inhibition of corrosion of a processing machine as well as weather resistance and flame retardancy, the piperazine pyrophosphate is preferably monopiperazine pyrophosphate in which the molar ratio of pyrophosphoric acid and piperazine is 1:1.

As for the molar ratio of phosphoric acid and piperazine in piperazine phosphate, from the standpoints of inhibition of corrosion of a processing machine as well as weather resistance and flame retardancy, the ratio of piperazine is preferably 0.4 to 0.6 mol, more preferably 0.45 to 0.55 mol, with respect to 1 mol of phosphorus atom of phosphoric acid.

Still further, in the phosphate amine salt composition of the present invention, from the standpoints of inhibition of corrosion of a processing machine as well as weather resistance and flame retardancy, the phosphate amine salt preferably contains at least one selected from the group consisting of a melamine orthophosphate, a melamine pyrophosphate and a melamine polyphosphate and at least one selected from the group consisting of a piperazine orthophosphate, a piperazine pyrophosphate and a piperazine polyphosphate, more preferably at least one selected from the group consisting of a melamine pyrophosphate and a melamine polyphosphate and at least one selected from the group consisting of a piperazine pyrophosphate and a piperazine polyphosphate, still more preferably a melamine pyrophosphate and a piperazine pyrophosphate.

From the standpoints of inhibition of corrosion of a processing machine as well as weather resistance and flame retardancy, the phosphate amine salt composition of the present invention is preferably a phosphate amine salt composition (A) whose amine is melamine (hereinafter, referred to as "melamine phosphate composition (A)"). From the standpoints of inhibition of corrosion of a processing machine as well as weather resistance and flame retardancy, the melamine phosphate composition (A) preferably contains at least one selected from the group consisting of a melamine orthophosphate, a melamine pyrophosphate and a melamine polyphosphate, more preferably contains at least one selected from the group consisting of a melamine pyrophosphate and a melamine polyphosphate, still more preferably contains a melamine pyrophosphate.

Further, from the standpoints of inhibition of corrosion of a processing machine as well as weather resistance and flame retardancy, the phosphate amine salt composition of the present invention is also preferably a phosphate amine salt composition (B) whose amine is piperazine (hereinafter, referred to as "piperazine phosphate composition (B)"). From the standpoints of inhibition of corrosion of a processing machine as well as weather resistance and flame retardancy, the piperazine phosphate composition (B) preferably contains at least one selected from the group consisting of a piperazine orthophosphate, a piperazine pyrophosphate and a piperazine polyphosphate, more preferably contains at least one selected from the group consisting of a piperazine pyrophosphate and a piperazine polyphosphate, still more preferably contains a piperazine pyrophosphate.

Still further, from the standpoints of inhibition of corrosion of a processing machine as well as weather resistance and flame retardancy in particular, the phosphate amine salt composition of the present invention preferably contains both of the melamine phosphate composition (A) and the piperazine phosphate composition (B). From the standpoints of inhibition of corrosion of a processing machine as well as weather resistance and flame retardancy in particular, the content ratio (mass basis) of the melamine phosphate composition (A) and the piperazine phosphate composition (B), (A)/(B), is preferably 20/80 to 80/20, more preferably 20/80 to 50/50, still more preferably 30/70 to 50/50, yet still more preferably 35/65 to 45/55.

The phosphate amine salt composition of the present invention contains 100 to 2,000 ppm by mass of ammonium cation. When the concentration of ammonium cation is lower than 100 ppm, the effect of inhibiting corrosion of a processing machine is lost, while when the concentration of ammonium cation is higher than 2,000 ppm by mass, the weather resistance is deteriorated. From the standpoints of inhibition of corrosion of a processing machine as well as weather resistance, the concentration of ammonium cation is preferably 200 to 1,700 ppm, more preferably 300 to 1,500 ppm.

The ammonium cation is contained in the form of ammonium phosphate (e.g. ammonium orthophosphate, ammonium pyrophosphate, and/or ammonium polyphosphate), which is a salt with phosphoric acid constituting the phosphate amine salt contained in the phosphate amine salt composition of the present invention. The concentration of ammonium cation is 100 to 2,000 ppm by mass with respect to all phosphoric acid salts (a total amount of phosphate amine salts and ammonium phosphates).

As a method of measuring the concentration of ammonium cation in all phosphoric acid salts, any method by which ammonium cation is analyzed may be employed, and it is particularly preferred to perform the measurement by an analysis method using the below-described cation chromatography.

<Ammonium Cation Analysis Method>
    Ion chromatography: ICS-2000 (manufactured by Nippon Dionex K.K.)
    Column: DIONEX IonPac CS17 (4×250 mm)
    Eluent: aqueous methanesulfonic acid solution An ammonium cation is generated by decomposition of an amine when a phosphate amine salt is heated or the like.

In the phosphate amine salt composition of the present invention, a phosphate amine salt obtained by neutralizing phosphoric acid and an amine can be used; however, from the standpoints of inhibition of corrosion of a processing machine as well as weather resistance, it is preferred to use a phosphate amine salt obtained by a dehydration-condensation reaction of an amine salt of orthophosphoric acid with heating. From the standpoints of inhibition of corrosion of a processing machine as well as weather resistance, it is more preferred to use a phosphate amine salt obtained by a dehydration-condensation reaction of an amine salt of orthophosphoric acid with heating that is performed in a solid-phase state, and the temperature of the dehydration-condensation reaction performed in a solid-phase state is preferably 120 to 350° C., more preferably 150 to 300° C., still more preferably 160 to 280° C. The dehydration-condensation reaction may be performed with adjustment of the reaction temperature, the reaction time and the like while analyzing, by ion chromatography, the residual amount of the amine salt of orthophosphoric acid used as a raw material, the amount of a pyrophosphate amine salt and/or a polyphosphate amine salt that are generated as a product(s), and the concentration of ammonium cation.

In a case where a melamine pyrophosphate is obtained as a phosphoric acid salt, from the standpoints of inhibition of corrosion of a processing machine as well as weather resistance and flame retardancy, a melamine salt of orthophosphoric acid that is used as a raw material is preferably monomelamine orthophosphate constituted by 1 mol of orthophosphoric acid and 1 mol of melamine.

In a case where a piperazine pyrophosphate is obtained as a phosphoric acid salt, from the standpoints of inhibition of corrosion of a processing machine as well as weather resistance and flame retardancy, a piperazine salt of orthophosphoric acid that is used as a raw material is preferably monopiperazine diorthophosphate constituted by 2 mol of orthophosphoric acid and 1 mol of piperazine.

Next, the phosphate amine salt flame retardant composition of the present invention will be described. The phosphate amine salt flame retardant composition of the present invention contains the phosphate amine salt composition of the present invention. The phosphate amine salt composition of the present invention is suitably used in a flame retardant, particularly a flame retardant of a synthetic resin, and is used as a phosphate amine salt flame retardant composition. When used as a phosphate amine salt flame retardant composition, the flame retardant composition may contain one or more kinds of the phosphate amine salt composition of the present invention.

In the phosphate amine salt flame retardant composition of the present invention, from the standpoints of inhibition of corrosion of a processing machine as well as weather resistance and flame retardancy, the content of the phosphate amine salt composition of the present invention is preferably 10% by mass to 100% by mass, more preferably 20% by mass to 100% by mass.

From the standpoints of inhibition of corrosion of a processing machine as well as weather resistance and flame retardancy, the phosphate amine salt flame retardant composition of the present invention preferably contains the melamine phosphate composition (A).

Further, from the standpoints of inhibition of corrosion of a processing machine as well as weather resistance and flame retardancy, the phosphate amine salt flame retardant composition of the present invention preferably contains the piperazine phosphate composition (B).

Moreover, from the standpoints of inhibition of corrosion of a processing machine as well as weather resistance and flame retardancy in particular, the phosphate amine salt flame retardant composition of the present invention preferably contains both the melamine phosphate composition (A) and the piperazine phosphate composition (B). From the standpoints of inhibition of corrosion of a processing machine as well as weather resistance and flame retardancy in particular, the content ratio (mass basis) of the melamine phosphate composition (A) and the piperazine phosphate composition (B), (A)/(B), is preferably 20/80 to 80/20, more preferably 20/80 to 50/50, still more preferably 30/70 to 50/50, yet still more preferably 35/65 to 45/55.

In the phosphate amine salt flame retardant composition of the present invention, a metal oxide that serves as a flame retardant aid may be incorporated as required within a range that does not impair the effects of the present invention. Examples of the metal oxide include zinc oxide, titanium oxide, magnesium oxide, and silicon oxide, among which zinc oxide is preferred. These metal oxides may be surface-treated as well.

As zinc oxide, a commercially available product can be used, and examples thereof include Zinc Oxide Type 1 (manufactured by Mitsui Mining and Smelting Co., Ltd.), partially coated-type zinc oxide (manufactured by Mitsui Mining and Smelting Co., Ltd.), NANOFINE 50 (ultrafine zinc oxide particles having an average particle size of 0.02 µm, manufactured by Sakai Chemical Industry Co., Ltd.), and NANOFINE K (zinc silicate-coated ultrafine zinc oxide particles having an average particle size of 0.02 µm; manufactured by Sakai Chemical Industry Co., Ltd.). When a metal oxide is incorporated, the content thereof is, from the standpoint of flame retardancy, preferably 0.01 to 10 parts by mass, more preferably 0.5 to 10 parts by mass, still more preferably 1.0 to 7.5 parts by mass, with respect to a total of 100 parts by mass of the phosphate amine salts contained in the phosphate amine salt flame retardant composition. When the content of the metal oxide is less than 0.01 parts by mass, the metal oxide does not exert a sufficient effect as a flame retardant aid, while when the content of the metal oxide is higher than 10 parts by mass, the metal oxide may cause deterioration of resin properties.

In addition, in the phosphate amine salt flame retardant composition of the present invention, an anti-drip agent may be incorporated as required within a range that does not impair the effects of the present invention. Examples of the anti-drip agent include fluorine-based anti-drip agents, silicone rubbers, and layered silicates.

The anti-drip agent is particularly preferably a fluorine-based anti-drip agent, and specific examples thereof include: fluorocarbon resins, such as polytetrafluoroethylenes, polyvinylidene fluorides, and polyhexafluoropropylenes; and alkali metal salts of perfluoroalkane sulfonic acids and alkaline earth metal salts of perfluoroalkane sulfonic acids, such as sodium perfluoromethane sulfonate, potassium perfluoro-n-butane sulfonate, potassium perfluoro-t-butane sulfonate, sodium perfluorooctane sulfonate, and calcium perfluoro-2-ethylhexane sulfonate. Among these anti-drip agents, a polytetrafluoroethylene is most preferred because of its drip-inhibiting property.

Examples of the layered silicates include: smectite-type clay minerals, such as montmorillonite, saponite, hectorite, beidellite, stevensite and nontronite; vermiculite; halloysite; swellable mica; and talc, and those in which organic cations, quaternary ammonium cations or phosphonium cations are intercalated between layers can also be used.

When an anti-drip agent is incorporated, the content thereof is preferably 0.005 to 5 parts by mass, more preferably 0.01 to 5 parts by mass, still more preferably 0.05 to 3 parts by mass, yet still more preferably 0.1 to 1 part by mass, with respect to a total of 100 parts by mass of the phosphate amine salts contained in the phosphate amine salt flame retardant composition. When the content of the anti-drip agent is less than 0.005 parts by mass, a sufficient drip-inhibiting effect is not attained, while when the content of the anti-drip agent is higher than 5 parts by mass, the anti-drip agent may cause deterioration of resin properties.

Further, in the phosphate amine salt flame retardant composition of the present invention, for the purposes of inhibiting secondary aggregation during blending and improving the water resistance, a silicone oil may be incorporated as required within a range that does not impair the effects of the present invention. Examples of the silicone oil include: dimethyl silicone oils in which the side chains and terminals of polysiloxane are all methyl groups; methylphenyl silicone oils in which some of the side chains of polysiloxane are phenyl groups; methyl hydrogen silicone oils in which some of the side chains of polysiloxane are hydrogen atoms; and copolymers of these silicone oils. In addition, modified silicone oils in which organic groups are introduced to some of the side chains and/or terminals of the above-described silicone oils, for example, amine-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, diol-modified, phenol-modified and/or aralkyl-modified silicone oils, can also be used.

Specific examples of the silicone oil include: dimethyl silicone oils, such as KF-96 (manufactured by Shin-Etsu Chemical Co., Ltd.), KF-965 (manufactured by Shin-Etsu Chemical Co., Ltd.), and KF-968 (manufactured by Shin-Etsu Chemical Co., Ltd.); methyl hydrogen silicone oils or silicone oils having a methyl hydrogen polysiloxane structure, such as KF-99 (manufactured by Shin-Etsu Chemical Co., Ltd.), KF-9901 (manufactured by Shin-Etsu Chemical Co., Ltd.), HMS-151 (manufactured by Gelest Inc.), HMS-071 (manufactured by Gelest Inc.), HMS-301 (manufactured by Gelest Inc.), and DMS-H21 (manufactured by Gelest Inc.); methylphenyl silicone oils, such as KF-50 (manufactured by Shin-Etsu Chemical Co., Ltd.), KF-53 (manufactured by Shin-Etsu Chemical Co., Ltd.), KF-54 (manufactured by Shin-Etsu Chemical Co., Ltd.), and KF-56 (manufactured by Shin-Etsu Chemical Co., Ltd.); epoxy-modified products, such as X-22-343 (manufactured by Shin-Etsu Chemical Co., Ltd.), X-22-2000 (manufactured by Shin-Etsu Chemical Co., Ltd.), KF-101 (manufactured by Shin-Etsu Chemical Co., Ltd.), KF-102 (manufactured by Shin-Etsu Chemical Co., Ltd.), and KF-1001 (manufactured by Shin-Etsu Chemical Co., Ltd.); carboxyl-modified products, such as X-22-3701E (manufactured by Shin-Etsu Chemical Co., Ltd.); carbinol-modified products, such as X-22-4039 (manufactured by Shin-Etsu Chemical Co., Ltd.) and X-22-4015 (manufactured by Shin-Etsu Chemical Co., Ltd.); and amine-modified products, such as KF-393 (manufactured by Shin-Etsu Chemical Co., Ltd.).

When a silicone oil is incorporated, the content thereof is preferably 0.01 to 10 parts by mass, more preferably 0.1 to 5 parts by mass, still more preferably 0.5 to 3 parts by mass, with respect to a total of 100 parts by mass of the phosphate amine salts contained in the phosphate amine salt flame retardant composition. When the content of the silicone oil is less than 0.01 parts by mass, the inhibition of secondary aggregation and the improvement of water resistance may be insufficient, while when the content of the silicone oil is higher than 10 parts by mass, the silicone oil may cause deterioration of resin properties.

Still further, in the phosphate amine salt flame retardant composition of the present invention, for the purposes of inhibiting aggregation of flame retardant powder to improve the storage stability and imparting water resistance and heat resistance, a silane coupling agent may be incorporated as required within a range that does not impair the effects of the present invention.

Examples of the silane coupling agent include: alkenyl group-containing silane coupling agents, such as vinyltrimethoxysilane, vinyltriethoxysilane, vinyltriacetoxysilane, vinyltris(2-methoxyethoxy)silane, vinylmethyldimethoxysilane, octenyltrimethoxysilane, allyltrimethoxysilane, and p-styryltrimethoxysilane; acryl group-containing silane coupling agents, such as 3-acryloxypropyltrimethoxysilane and 3-acryloxypropyltriethoxysilane; methacryl group-containing silane coupling agents, such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and methacryloxyoctyltrimethoxysilane; epoxy group-containing silane coupling agents, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; amino group-containing silane coupling agents, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N,N-bis[3-(trimethoxysilyl)propyl]ethylenediamine, and a hydrochloride of N-(vinylbenzyl)-2-aminoethyl-3-aminopropyltrimethoxysilane; isocyanurate group-containing silane coupling agents, such as tris(trimethoxysilylpropyl)isocyanurate; mercapto group-containing silane coupling agents, such as 3-mercaptopropylmethyldimethoxysilane, 3-mercaptopropyltrimethoxysilane, and 3-mercaptopropyltriethoxysilane; ureido group-containing silane coupling agents, such as 3-ureidopropyltrimethoxysilane and 3-ureidopropyltriethoxysilane; sulfide group-containing silane coupling agents, such as bis(triethoxysilylpropyl)tetrasulfide; thioester group-containing silane coupling agents, such as 3-octanoylthio-1-propyltriethoxysilane; and isocyanate group-containing silane coupling agents, such as 3-isocyanate propyltriethoxysilane and 3-isocyanate propyltrimethoxysilane. Among these silane coupling agents, from the standpoints of inhibiting aggregation of flame retardant powder to improve the storage stability and imparting water resistance and heat resistance, epoxy group-containing silane coupling agents are preferred.

As the silane coupling agent, a commercially available product can be used, and examples thereof include: vinyltrimethoxysilane, such as KBM-1003 manufactured by Shin-Etsu Chemical Co., Ltd., A-171 manufactured by Momentive Performance Materials Japan LLC, Z-6300 manufactured by Dow Corning Toray Co., Ltd., GENIOSIL XL10 manufactured by Wacker Asahikasei Silicone Co., Ltd., and SILA-ACE S210 manufactured by Nichibi Trading Co., Ltd.; vinyltriethoxysilane, such as KBE-1003 manufactured by Shin-Etsu Chemical Co., Ltd., A-151 manufactured by Momentive Performance Materials Japan LLC, Z-6519 manufactured by Dow Corning Toray Co., Ltd., GENIOSIL GF56 manufactured by Wacker Asahikasei Silicone Co., Ltd., and SILA-ACE S220 manufactured by Nichibi Trading Co., Ltd.; vinyltriacetoxysilane, such as GENIOSIL GF62 manufactured by Wacker Asahikasei Silicone Co., Ltd.; vinyltris(2-methoxyethoxy)silane, such as A-172 manufactured by Momentive Performance Materials Japan LLC; vinylmethyldimethoxysilane, such as A-2171 manufactured by Momentive Performance Materials Japan LLC and GENIOSIL XL12 manufactured by Wacker Asahikasei Silicone Co., Ltd.; octenyltrimethoxysilane, such as KBM-1083 manufactured by Shin-Etsu Chemical Co., Ltd.; allyltrimethoxysilane, such as Z-6825 manufactured by Dow Corning Toray Co., Ltd.; p-styryltrimethoxysilane, such as KBM-1403 manufactured by Shin-Etsu Chemical Co., Ltd.; 3-acryloxypropyltrimethoxysilane, such as KBM-5103; 3-methacryloxypropylmethyldimethoxysilane, such as KBM-502 manufactured by Shin-Etsu Chemical Co., Ltd., and Z-6033 manufactured by Dow Corning Toray Co., Ltd.; 3-methacryloxypropyltrimethoxysilane, such as KBM-503 manufactured by Shin-Etsu Chemical Co., Ltd., A-174 manufactured by Momentive Performance Materials Japan LLC, Z-6030 manufactured by Dow Corning Toray Co., Ltd., GENIOSIL GF31 manufactured by Wacker Asahikasei Silicone Co., Ltd., and SILA-ACE S710 manufactured by Nichibi Trading Co., Ltd.; 3-methacryloxypropylmethyldiethoxysilane, such as KBE-502 manufactured by Shin-Etsu Chemical Co., Ltd.; 3-methacryloxypropyltriethoxysilane, such as KBE-503 manufactured by Shin-Etsu Chemical Co., Ltd., and Y-9936 manufactured by Momentive Performance Materials Japan LLC; methacryloxyoctyltrimethoxysilane, such as KBM-5803 manufactured by Shin-Etsu Chemical Co., Ltd.; 2-(3,4-epoxycyclohexyl)ethyltrimethoxysilane, such as KBM-303 manufactured by Shin-Etsu Chemical Co., Ltd., A-186 manufactured by Momentive Performance Materials Japan LLC, Z-6043 manufactured by Dow Corning Toray Co., Ltd., and SILA-ACE S530 manufactured by Nichibi Trading Co., Ltd.; 3-glycidoxypropylmethyldimethoxysilane, such as KBM-402 manufactured by Shin-Etsu Chemical Co., Ltd., Z-6044 manufactured by Dow Corning Toray Co., Ltd., and SILA-ACE S520 manufactured by Nichibi Trading Co., Ltd.; 3-glycidoxypropyltrimethoxysilane, such as KBM-403 manufactured by Shin-Etsu Chemical Co., Ltd., A-187 manufactured by Momentive Performance Materials Japan LLC, Z-6040 manufactured by Dow Corning Toray Co., Ltd., GENIOSIL GF80 manufactured by Wacker Asahikasei Silicone Co., Ltd., and SILA-ACE S510 manufactured by Nichibi Trading Co., Ltd.; 3-glycidoxypropylmethyldiethoxysilane, such as KBE-402 manufactured by Shin-Etsu Chemical Co., Ltd.; 3-glycidoxypropyltriethoxysilane, such as KBE-403 manufactured by Shin-Etsu Chemical Co., Ltd., A-1871 manufactured by Momentive Performance Materials Japan LLC, and GENIOSIL GF82 manufactured by Wacker Asahikasei Silicone Co., Ltd.; glycidoxyoctyltrimethoxysilane, such as KBM-4803 manufactured by Shin-Etsu Chemical Co., Ltd.; N-2-(aminoethyl)-3-aminopropylmethyldimethoxysilane, such as KBM-602 manufactured by Shin-Etsu Chemical Co., Ltd., A-2120 manufactured by Momentive Performance Materials Japan LLC, GENIOSIL GF-95 manufactured by Wacker Asahikasei Silicone Co., Ltd., and SILA-ACE S310 manufactured by Nichibi Trading Co., Ltd.; N-2-(aminoethyl)-3-aminopropyltrimethoxysilane, such as KBM-603 manufactured by Shin-Etsu Chemical Co., Ltd., A-1120 manufactured by Momentive Performance Materials Japan LLC, A-1122 manufactured by Momentive Performance Materials Japan LLC, Z-6020 manufactured by Dow Corning Toray Co., Ltd., Z-6094 manufactured by Dow Corning Toray Co., Ltd., GENIOSIL GF-91 manufactured by Wacker Asahikasei Silicone Co., Ltd., and SILA-ACE S320 manufactured by Nichibi Trading Co., Ltd.; 3-aminopropyltrimethoxysilane, such as KBM-903 manufactured by Shin-Etsu Chemical Co., Ltd., A-1110 manufactured by Momentive Performance Materials Japan LLC, Z-6610 manufactured by Dow Corning Toray Co., Ltd., and SILA-ACE S360 manufactured by Nichibi Trading Co., Ltd.; 3-aminopropyltriethoxysilane, such as KBE-903, A-1100 manufactured by Momentive Performance Materials Japan LLC, Z-6011 manufactured by Dow Corning Toray Co., Ltd., and SILA-ACE S330 manufactured by Nichibi Trading Co., Ltd.; 3-triethoxysilyl-N-(1,3-dimethyl-butylidene)propylamine, such as KBE-9103, and SILA-ACE S340 manufactured by Nichibi Trading Co., Ltd.; N-phenyl-3-aminopropyltrimethoxysilane, such as KBM-573 manufactured by Shin-Etsu Chemical Co., Ltd., Y-9669 manufactured by Momentive Performance Materials Japan LLC, and Z-6883 manufactured by Dow Corning Toray Co., Ltd.; N,N'-bis[3-(trimethoxysilyl)propyl]ethylenediamine, such as SILA-ACE XS1003 manufactured by Nichibi Trading Co., Ltd.; N-(vinylbenzyl)-2-aminoethyl-3-aminopropyltrimethoxysilane hydrochloride, such as KBM-575 manufactured by Shin-Etsu Chemical Co., Ltd., Z-6032 manufactured by Dow Corning Toray Co., Ltd., and SILA-ACE S350 manufactured by Nichibi Trading Co., Ltd.; tris(trimethoxysilylpropyl)isocyanurate, such as KBM-9659 manufactured by Shin-Etsu Chemical Co., Ltd.; 3-mercaptopropylmethyldimethoxysilane, such as KBM-802 manufactured by Shin-Etsu Chemical Co., Ltd., and Z-6852 manufactured by Dow Corning Toray Co., Ltd.; 3-mercaptopropyltrimethoxysilane, such as KBM-803 manufactured by Shin-Etsu Chemical Co., Ltd., A-189 manufactured by Momentive Performance Materials Japan LLC, Z-6062 manufactured by Dow Corning Toray Co., Ltd., and SILA-ACE S810 manufactured by Nichibi Trading Co., Ltd.; 3-mercaptopropyltriethoxysilane, such as A-1891 manufactured by Momentive Performance Materials Japan LLC, and Z-6911 manufactured by Dow Corning Toray Co., Ltd.; 3-ureidopropyltriethoxysilane, such as A-1160 manufactured by Momentive Performance Materials Japan LLC; 3-ureidopropyltrialkoxysilane, such as KBE-585 manufactured by Shin-Etsu Chemical Co., Ltd.; bis(triethoxysilylpropyl)tetrasulfide, such as KBE-846 manufactured by Shin-Etsu Chemical Co., Ltd.; 3-octanoylthio-1-propyltriethoxysilane, such as A-LINK599 manufactured by Momentive Performance Materials Japan LLC; 3-isocyanate propyltriethoxysilane, such as KBE-9007 manufactured by Shin-Etsu Chemical Co., Ltd., and A-1310 manufactured by Momentive Performance Materials Japan LLC; and 3-isocyanate propyltrimethoxysilane, such as Y-5187 manufactured by Momentive Performance Materials Japan LLC, and GENIOSIL GF40 manufactured by Wacker Asahikasei Silicone Co., Ltd.

When a silane coupling agent is incorporated into the phosphate amine salt flame retardant composition of the present invention, the content thereof is preferably 0.01 to 5.0 parts by mass, more preferably 0.05 to 3.0 parts by mass, still more preferably 0.1 to 2.0 parts by mass, with respect to a total of 100 parts by mass of the phosphate amine salts contained in the phosphate amine salt flame retardant composition.

In the phosphate amine salt flame retardant composition of the present invention, from the standpoints of heat resistance and weather resistance as well as reducing the risk of corrosion of a processing machine, a hydrotalcite compound may be incorporated as required within a range that does not impair the effects of the present invention. In the present invention, the term "hydrotalcite compound" refers to a carbonate double salt compound of magnesium and/or zinc and aluminum. The hydrotalcite compound may be a naturally-occurring or synthetic hydrotalcite. Examples of a method of synthesizing a synthetic hydrotalcite include known methods that are described in JPS46-2280B1, JPS50-30039B1, JPS51-29129B1, JPS61-174270A and the like. In the present invention, the above-described hydrotalcites can be used without any restriction in terms of crystal structure, crystal grain system, the presence or absence of crystal water, the amount of crystal water, and the like.

The hydrotalcite compound may be treated with perchloric acid, and it is also possible to use a hydrotalcite compound whose surface is coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax. The hydrotalcite compound is preferably a compound represented by the following Formula (1):

$$Mg_{x1}Zn_{x2}Al_2(OH)_{2(x1+x2)+4} \cdot CO_3 \cdot mH_2O \quad (1)$$

wherein x1 and x2 each represent a number that satisfies the conditions represented by the following equations, and m represents a real number: $0 \leq x2/x1 < 10$, and $2 \leq (x1+x2) < 20$.

As the hydrotalcite compound, a commercially available product can be used, and examples thereof include DHT-4 (hydrotalcite: manufactured by Kyowa Chemical Industry Co., Ltd.), DHT-4A (hydrotalcite: manufactured by Kyowa Chemical Industry Co., Ltd.), MAGCELER 1 (hydrotalcite: manufactured by Kyowa Chemical Industry Co., Ltd.), ALCAMIZER 1 (hydrotalcite: manufactured by Kyowa Chemical Industry Co., Ltd.), ALCAMIZER 2 (hydrotalcite: manufactured by Kyowa Chemical Industry Co., Ltd.), ALCAMIZER 4 (ALCAMIZER P-93) (zinc-modified hydrotalcite: manufactured by Kyowa Chemical Industry Co., Ltd.), ALCAMIZER 7 (zinc-modified hydrotalcite: manufactured by Kyowa Chemical Industry Co., Ltd.), and ALCAMIZER 5 (perchloric acid-treated hydrotalcite: manufactured by Kyowa Chemical Industry Co., Ltd.), among which DHT-4A (hydrotalcite: manufactured by Kyowa Chemical Industry Co., Ltd.) is particularly preferred.

When a hydrotalcite compound is incorporated, the content thereof with respect to a total of 100 parts by mass of the phosphate amine salts contained in the phosphate amine salt flame retardant composition is preferably 0.01 to 5 parts by mass and, from the standpoints of heat resistance and weather resistance as well as reducing the risk of corrosion of a processing machine, the content of the hydrotalcite compound is more preferably 0.05 to 4 parts by mass, still more preferably 0.1 to 2 parts by mass.

In the phosphate amine salt flame retardant composition of the present invention, a flame retardant aid other than the above-described metal oxides may also be incorporated as required within a range that does not impair the effects of the present invention. This flame retardant aid is, for example, a polyhydric alcohol compound.

The "polyhydric alcohol compound" refers to a compound in which plural hydroxyl groups are bound and which is added as a flame retardant aid for improving the flame retardancy. Examples of the polyhydric alcohol compound used as a flame retardant aid include pentaerythritol, dipentaerythritol, tripentaerythritol, polypentaerythritol, neopentyl glycol, trimethylolpropane, ditrimethylolpropane, 1,3,5-tris(2-hydroxyethyl)isocyanurate, polyethylene glycol, glycerin, diglycerin, mannitol, maltitol, lactitol, sorbitol, erythritol, xylitol, xylose, sucrose, trehalose, inositol, fructose, maltose, and lactose. Among these polyhydric alcohol compounds, a pentaerythritol or a pentaerythritol condensate, such as pentaerythritol, dipentaerythritol, tripentaerythritol or polypentaerythritol, is preferred, a pentaerythritol condensate is more preferred, and dipentaerythritol is particularly preferred. Further, 1,3,5-tris(2-hydroxyethyl)isocyanurate and sorbitol can be suitably used as well. The pentaerythritol condensate may be a mixture of pentaerythritol and pentaerythritol condensate.

In the phosphate amine salt flame retardant composition of the present invention, a lubricant may also be incorporated as required within a range that does not impair the effects of the present invention. Examples of the lubricant include: pure hydrocarbon-based lubricants, such as liquid paraffins, natural paraffins, microwaxes, synthetic paraffins, low-molecular-weight polyethylenes, and polyethylene waxes; halogenated hydrocarbon-based lubricants; fatty acid-based lubricants, such as higher fatty acids and oxy fatty acids; fatty acid amide-based lubricants, such as fatty acid amides and bis-fatty acid amides; ester-based lubricants, such as lower alcohol esters of fatty acids, polyhydric alcohol esters of fatty acids (e.g., glyceride), polyglycol esters of fatty acids, and fatty alcohol esters of fatty acids (ester waxes); metallic soaps; fatty alcohols; polyhydric alcohols; polyglycols; polyglycerols; partial esters of fatty acids and polyhydric alcohols; partial ester-based lubricants composed of fatty acid, polyglycol and polyglycerol; silicone oils; and mineral oils. Two or more of these lubricants may be used in combination.

When a lubricant is incorporated, the content thereof is preferably 0.05 to 10 parts by mass, more preferably 0.1 to 5 parts by mass, with respect to a total of 100 parts by mass of the phosphate amine salts contained in the phosphate amine salt flame retardant composition.

In the phosphate amine salt flame retardant composition of the present invention, one or more halogen-free organic or inorganic flame retardants or flame retardant aids may be further used as required within a range that does not impair the effects of the present invention. Examples of such flame retardants and flame retardant aids include triazine ring-containing compounds, metal hydroxides, phosphate-based flame retardants, condensed phosphate-based flame retardants, inorganic phosphorus-based flame retardants, dialkyl phosphinates, silicone-based flame retardants, metal oxides, boric acid compounds, expandable graphites, other inorganic flame retardant aids, and other organic flame retardants.

Examples of the triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide, and KISUMA 5A (trademark of magnesium hydroxide manufactured by Kyowa Chemical Industry Co., Ltd.).

Examples of the phosphate-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl)phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis(isopropylphenyl)diphenyl phosphate, and tris(isopropylphenyl)phosphate.

Examples of the condensed phosphate-based flame retardants include 1,3-phenylene-bis(diphenyl phosphate), 1,3-phenylene-bis(dixylenyl phosphate), bisphenol A-bis(diphenyl phosphate), naphthalene-2,5-diyl-tetraphenyl bis(phosphate), [1,1'-biphenyl]-4,4'-diyl-tetraphenyl bis(phosphate), [1,1'-biphenyl]-4,4'-diyl-tetrakis(2,6-dimethylphenyl)bis(phosphate), tetraphenyl(thiobis(4,1-phenylene))bis(phosphate), and tetraphenyl(sulfonyl-bis(4,1-phenylene))bis(phosphate).

Examples of the inorganic phosphorus-based flame retardants include red phosphorus.

Examples of the dialkyl phosphinates include aluminum diethylphosphinate and zinc diethylphosphinate.

Examples of other inorganic flame retardant aids include inorganic compounds, such as titanium oxide, aluminum oxide, magnesium oxide, and hydrotalcite; and surface-treated products thereof. Specifically, for example, a variety of commercially available products, such as TIPAQUE R-680 (trademark of titanium oxide manufactured by Ishihara Sangyo Kaisha, Ltd.), KYOWAMAG 150 (trademark of magnesium oxide manufactured by Kyowa Chemical Industry Co., Ltd.), DHT-4A (hydrotalcite, manufactured by Kyowa Chemical Industry Co., Ltd.) and ALCAMIZER 4 (trademark of zinc-modified hydrotalcite manufactured by Kyowa Chemical Industry Co., Ltd.), can be used.

In the phosphate amine salt flame retardant composition of the present invention, as required, a phenolic antioxidant, a phosphorus-based antioxidant, a thioether-based antioxidant, an ultraviolet absorber, a hindered amine-based light stabilizer, an age inhibitor and the like may be incorporated as well. These components may be incorporated into the phosphate amine salt flame retardant composition of the present invention in advance, or may be incorporated into a synthetic resin at the time of blending the phosphate amine salt flame retardant composition with the synthetic resin. It is preferred to stabilize the synthetic resin by incorporating these components.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) promionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl) propionic acid methyl]methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane, and triethylene glycol-bis[(3-tert-butyl-4-hydroxy-5-methylphenyl)propionate]. When incorporated into a synthetic resin, these phenolic antioxidants are used in an amount of preferably 0.001 to 10 parts by mass, more preferably 0.05 to 5 parts by mass, with respect to 100 parts by mass of the synthetic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl- 2-butylpropylene glycol and 2,4,6-tri-tert-butylphenol. When incorporated into a synthetic resin, these phosphorus-based antioxidants are used in an amount of preferably 0.001 to 10 parts by mass, more preferably 0.05 to 5 parts by mass, with respect to 100 parts by mass of the synthetic resin.

Examples of the thioether-based antioxidant include: dialkyl thiodipropionates, such as dilauryl thiodipropionate, dimyristyl thiodipropionate, and distearyl thiodipropionate; and pentaerythritol tetra(β-alkylmercaptopropionic acid) esters. When incorporated into a synthetic resin, these thioether-based antioxidants are used in an amount of preferably 0.001 to 10 parts by mass, more preferably 0.05 to 5 parts by mass, with respect to 100 parts by mass of the synthetic resin.

Examples of the ultraviolet absorber include: 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and triaryltriazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. When incorporated into a synthetic resin, these ultraviolet absorbers are used in an amount of preferably 0.001 to 30 parts by mass, more preferably 0.05 to 10 parts by mass, with respect to 100 parts by mass of the synthetic resin.

Examples of the hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1,2,2,6,6-pentamethyl-4-piperidyl methacrylate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], 1,2,3,4-butanecarboxylic acid/2,2-bis(hydroxymethyl)-1,3-propanediol/3-hydroxy-2,2-dimethylpropanal/1,2,2,6,6-pentamethyl-4-piperidinyl ester polycondensate, bis(1,2,2,6,6-pentamethyl-4-piperidyl)=decane dioate/methyl=1,2,2,6,6-pentamethyl-4-piperidyl=sebacate mixture, 2,2,6,6-tetramethyl-4-piperidyl methacrylate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5]undecane, bis(1-undecyloxy-2,2,6,6-tetramethylpiperidin-4-yl)carbonate, 2,2,6,6-tetramethyl-4-piperidyl hexadecanoate, and 2,2,6,6-tetramethyl-4-piperidyl octadecanoate. When incorporated into a synthetic resin, these hindered amine-based light stabilizers are used in an amount of preferably 0.001 to 30 parts by mass, more preferably 0.05 to 10 parts by mass, with respect to 100 parts by mass of the synthetic resin.

Examples of the age inhibitor include naphthylamine-based age inhibitors, diphenylamine-based age inhibitors, p-phenyldiamine-based age inhibitors, quinoline-based age inhibitors, hydroquinone derivatives, monophenol-based age inhibitors, thiobisphenol-based age inhibitors, hindered phenol-based age inhibitors, and phosphite-based age inhibitors. When incorporated into a synthetic resin, these age inhibitors are used in an amount of preferably 0.001 to 10 parts by mass, more preferably 0.05 to 5 parts by mass, with respect to 100 parts by mass of the synthetic resin.

In the phosphate amine salt flame retardant composition of the present invention, a reinforcing material may also be incorporated as an optional component within a range that does not impair the effects of the present invention. This component may be incorporated into a synthetic resin at the time of blending the phosphate amine salt flame retardant composition of the present invention with the synthetic resin. As the reinforcing material, a fiber-form, plate-form, particle-form or powder-form reinforcing material that is usually used for reinforcement of a synthetic resin can be used. Specific examples thereof include: inorganic fibrous reinforcing materials, such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonolite, ellestadite, gypsum fibers, silica fibers, silica-alumina fibers, zirconia fibers, boron nitride fibers, silicon nitride fibers, and boron fibers; organic fibrous reinforcing materials, such as polyester fibers, nylon fibers, acrylic fibers, regenerated cellulose fibers, acetate fibers, kenaf, ramie, cotton, jute, hemp, sisal, flax, linen, silk, Manila hemp, sugarcane, wood pulp, wastepaper, recycled wastepaper, and wool; and plate-form and particle-form reinforcing materials, such as glass flake, non-swelling mica, graphites, metal foils, ceramic beads, clay, mica, sericite, zeolite, bentonite, dolomite, kaolin, fine powder silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite, and white clay. These reinforcing materials may be coated or bundled with a thermoplastic resin such as an ethylene/vinyl acetate copolymer or a thermosetting resin such as an epoxy resin, or may be treated with a coupling agent such as aminosilane or epoxysilane.

In the phosphate amine salt flame retardant composition of the present invention, a nucleating agent may be further incorporated as an optional component within a range that does not impair the effects of the present invention. As the nucleating agent, one which is generally used as a nucleating agent of a polymer can be used as appropriate and, in the present invention, any of inorganic nucleating agents and organic nucleating agents can be used. These components may be incorporated into a synthetic resin at the time of blending the phosphate amine salt flame retardant composition of the present invention with the synthetic resin.

Specific examples of the inorganic nucleating agents include kaolinite, synthetic mica, clay, zeolite, silica, graphite, carbon black, magnesium oxide, titanium oxide, calcium sulfide, boron nitride, calcium carbonate, barium sulfate, aluminum oxide, neodymium oxide, and metal salts of phenylphosphonate. These inorganic nucleating agents may be modified with an organic substance so as to improve their dispersion in the composition.

Specific examples of the organic nucleating agents include: organic metal carboxylates, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexane carboxylate; organic sulfonates, such as sodium β-toluene sulfonate and sodium sulfoisophthalate; carboxylic acid amides, such as stearic acid amide, ethylene-bis-lauric acid amide, palmitic acid amide, hydroxystearic acid amide, erucic acid amide, and trimesic acid tris(t-butylamide); benzylidene sorbitol and derivatives thereof; phosphorus compound metal salts, such as sodium-2,2'-methylene-bis(4,6-di-t-butylphenyl)phosphate; and 2,2-methylbis(4,6-di-t-butylphenyl)sodium.

Further, to the phosphate amine salt flame retardant composition of the present invention, for the purpose of neutralizing a residual catalyst in the synthetic resin, a known neutralizer may be added as an optional component within a range that does not impair the effects of the present invention. Examples of the neutralizer include: fatty acid metal salts, such as calcium stearate, lithium stearate and sodium stearate; and fatty acid amide compounds, such as ethylene-bis(stearamide), ethylene-bis(12-hydroxystearamide) and stearic acid amide, and these neutralizers may be used in the form of a mixture.

Still further, in the phosphate amine salt flame retardant composition of the present invention, an acrylic processing aid may be incorporated as an optional component within a range that does not impair the effects of the present invention. As the acrylic processing aid, one obtained by polymerizing a single kind of (meth)acrylic acid ester or copolymerizing two or more kinds of (meth)acrylic acid esters can be used. This component may be incorporated into a synthetic resin at the time of blending the flame retardant composition of the present invention with the synthetic resin. Examples of the (meth)acrylic acid ester(s) to be polymerized/copolymerized include (meth)acrylates, such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, t-butyl methacrylate, n-hexyl acrylate, n-hexyl methacrylate, 2-ethylhexyl acrylate, 2-ethylhexyl methacrylate, dodecyl methacrylate, and tridecyl methacrylate. Other examples include (meth)acrylic acid and hydroxy group-containing (meth)acrylates.

In the phosphate amine salt flame retardant composition of the present invention, a plasticizer may be further incorporated as an optional component within a range that does not impair the effects of the present invention. As the plasticizer, one which is generally used as a plasticizer of a polymer can be used as appropriate, and examples thereof include polyester-based plasticizers, glycerol-based plasticizers, polycarboxylic acid ester-based plasticizers, polyalkylene glycol-based plasticizers, ether ester-based plasticizers, and epoxy-based plasticizers. This component may also be incorporated into a synthetic resin at the time of blending the phosphate amine salt flame retardant composition of the present invention with the synthetic resin.

In addition to the above, in the phosphate amine salt flame retardant composition of the present invention, an additive(s) normally used in a synthetic resin, such as a cross-linking agent, an antistatic agent, a metallic soap, a filler, an anti-fogging agent, a plate-out inhibitor, a surface treatment agent, a fluorescent agent, an antifungal agent, a disinfectant, a foaming agent, a metal inactivator, a mold release agent, a pigment and/or a processing aid other than the above-described acrylic processing aid, can be incorporated as required within a range that does not impair the effects of the present invention. These components may also be incorporated into a synthetic resin at the time of blending the phosphate amine salt flame retardant composition of the present invention with the synthetic resin.

In cases where two or more phosphate amine salts are used as the phosphate amine salt flame retardant composition of the present invention or the flame retardant composition is mixed with the above-described other components, a variety of mixing machines can be employed for mixing. The mixing may be performed with heating. Examples of the mixing machines that can be employed include a tumbler mixer, a Henschel mixer, a ribbon blender, a V-type mixer, a W-type mixer, a super mixer, and a Nauta mixer.

Next, the flame-retardant synthetic resin composition of the present invention will be described. The flame-retardant synthetic resin composition of the present invention is obtained by incorporating the phosphate amine salt flame retardant composition of the present invention into a synthetic resin. The phosphate amine salt flame retardant composition of the present invention is effective in flame-proofing of synthetic resins and preferably blended with a synthetic resin to be used as a flame-retardant synthetic resin composition. The flame-retardant synthetic resin composition of the present invention not only inhibits corrosion of a processing machine and has excellent workability, but also yields a molded article having excellent weather resistance and excellent flame retardancy.

Specific examples of synthetic resins to be flame-proofed by the phosphate amine salt flame retardant composition of the present invention include: α-olefin polymers, such as polypropylenes, high-density polyethylenes, low-density polyethylenes, linear low-density polyethylenes, cross-linked polyethylenes, ultrahigh-molecular-weight polyethylenes, polybutene-1, and poly-3-methylpentene; polyolefins and copolymers thereof, such as ethylene-vinyl acetate copolymers, ethylene-ethyl acrylate copolymers, and ethylene-propylene copolymers; halogen-containing resins, such as polyvinyl chloride, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polystyrenes; polyvinyl acetates; acrylic resins; polymethyl methacrylates; polyvinyl alcohols; polyvinyl formals; polyvinyl butyrals; aromatic polyesters, such as polyalkylene terephthalates (e.g., polyethylene terephthalate, polybutylene terephthalate, and polycyclohexane dimethylene terephthalate) and polyalkylene naphthalates (e.g., polyethylene naphthalate and polybutylene naphthalate); linear polyesters such as polytetramethylene terephthalate; degradable aliphatic polyesters, such as polyhydroxy butyrate, polycaprolactone, polybutylene succinate, polyethylene succinate, polylactic acid, polymalic acid, polyglycolic acid, polydioxane and poly(2-oxetanone); thermoplastic resins and blends thereof, such as polyamides (e.g., polyphenylene oxide, polycaprolactam, and polyhexamethylene adipamide), polycarbonates, branched polycarbonates, polyacetals, polyphenylene sulfides, polyurethanes, and cellulose-based resins; thermosetting resins, such as phenol resins, urea resins, melamine resins, epoxy resins, and unsaturated polyester resins; fluorocarbon resins; silicone resins; silicone rubber polyether sulfones; polysulfones; polyphenylene ethers; polyether ketones; polyether ether ketones; and liquid crystal polymers. Other examples include isoprene rubbers, butadiene rubbers, acrylonitrile-butadiene copolymer rubbers, styrene-butadiene copolymer rubbers, fluorine rubbers, and silicone rubbers.

Specific examples of synthetic resins to be flame-proofed further include olefin-based thermoplastic elastomers, styrene-based thermoplastic elastomers, polyester-based thermoplastic elastomers, nitrile-based thermoplastic elastomers, nylon-based thermoplastic elastomers, vinyl chloride-based thermoplastic elastomers, polyamide-based thermoplastic elastomers, and polyurethane-based thermoplastic elastomers. These synthetic resins may be used individually, or two or more thereof may be used in combination. Further, these synthetic resins may be alloyed as well.

In the present invention, the above-described synthetic resins can be used regardless of, for example, the molecular weight, the polymerization degree, the density, the softening point, the insoluble component-to-solvent ratio, the degree of stereoregularity, the presence or absence of a catalyst residue, the type and blend ratio of each material monomer, and the type of a polymerization catalyst (e.g., a Ziegler catalyst or a metallocene catalyst). Among above-described synthetic resins, polyolefin-based resins are preferred since excellent flame retardancy can be imparted thereto.

Examples of the polyolefin-based resins include: α-olefin polymers, such as polyethylenes, low-density polyethylenes, linear low-density polyethylenes, high-density polyethylenes, polypropylenes, homopolypropylenes, random copolymer polypropylenes, block copolymer polypropylenes, impact copolymer polypropylenes, high-impact copolymer polypropylenes, isotactic polypropylenes, syndiotactic polypropylenes, hemi-isotactic polypropylenes, maleic anhydride-modified polypropylenes, polybutenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, ethylene-methyl methacrylate copolymers, and ethylene-vinyl acetate copolymers.

In the flame-retardant synthetic resin composition of the present invention, from the standpoints of inhibition of corrosion of a processing machine as well as weather resistance and flame retardancy, a total content of the phosphate amine salt flame retardant composition is preferably 10% by mass to less than 60% by mass, more preferably 20% by mass to less than 50% by mass, still more preferably 25% by mass to less than 45% by mass. When the content of the phosphate amine salt flame retardant composition is less than 10% by mass, sufficient flame retardancy may not be exerted, while when the content is 60% by mass or higher, the physical properties intrinsic to the resin may be deteriorated.

Next, the molded article of the present invention will be described. The molded article of the present invention is obtained from the flame-retardant synthetic resin composition of the present invention. A molded article having excellent flame retardancy and weather resistance can be obtained by molding the flame-retardant synthetic resin composition of the present invention. A molding method is not particularly restricted, and examples thereof include extrusion processing, calender processing, injection molding, rolling, compression molding, and blow molding. Molded articles of various shapes, such as resin plates, sheets, films, fibers and special shape articles, can be produced by these methods.

The flame-retardant synthetic resin composition of the present invention does not present a risk of corroding a processing machine during processing, and a molded article obtained therefrom has excellent weather resistance and flame retardancy.

The flame-retardant synthetic resin composition of the present invention and a molded article thereof can be used for housings (e.g., frames, casings, covers, and exterior materials) and components of electric vehicles, machines, electric/electronic appliances, office-automation equipment and the like, as well as automobile interior and exterior materials.

The flame-retardant synthetic resin composition of the present invention and a molded article thereof can be used in a wide range of industrial fields, including the fields of electricity/electronics/communication, agriculture/forestry/fisheries, mining, construction, foods, textiles, clothing, health care, coal, petroleum, rubber, leather, automobiles, precision instruments, wood materials, building materials, civil engineering, furniture, printing and musical instruments. More specifically, the flame-retardant synthetic resin composition of the present invention and a molded article thereof can be applied to, for example, office supplies and office-automation equipment, such as printers, personal computers, word processors, keyboards, PDA (Personal Digital Assistant) devices, telephones, copy machines, facsimile machines, ECRs (electronic cash registers), electronic calculators, electronic organizers, cards, holders, and stationery; home electrical appliances, such as laundry machines, refrigerators, vacuum cleaners, microwave ovens, lighting fixtures, gaming machines, irons, and foot warmers; audio-visual equipment, such as TVs, video tape recorders, video cameras, radio-cassette recorders, tape recorders, mini discs, CD players, speakers, and liquid crystal displays; electric and electronic components, such as connectors, relays, capacitors, switches, printed circuit boards, coil bobbins, semiconductor sealing materials, LED sealing materials, electric wires, cables, transformers, deflection yokes, distribution boards, and clocks; housings (e.g., frames, casings, covers, and exterior materials) and components of communication equipment, office-automation equipment and the like; and automobile interior and exterior materials.

The flame-retardant synthetic resin composition of the present invention and a molded article thereof can also be used in other various applications, for example, materials of automobiles, hybrid cars, electric cars, vehicles, ships, airplanes, buildings and houses, as well as construction and civil engineering materials, such as seats (e.g., stuffing and cover materials), belts, ceiling covers, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, carpets, wallpapers, wall decorating materials, exterior materials, interior materials, roof materials, deck materials, wall materials, pillar materials, floor boards, fence materials, framework and molding materials, window and door-shaping materials, shingle boards, sidings, terraces, balconies, soundproof boards, heat insulating boards, and window materials; and household articles and sporting goods, such as clothing materials, curtains, bed linens, plywood boards, synthetic fiber boards, rugs, doormats, leisure sheets, buckets, hoses, containers, eye glasses, bags, casings, goggles, skis, rackets, tents, and musical instruments.

EXAMPLES

The present invention will now be described concretely by way of Examples thereof. It is noted here, however, that the present invention is not restricted by the following Examples.

The phosphate amine salt compositions of the present invention was produced in accordance with the below-described Production Examples 1 to 10. In addition, comparative phosphate amine salt compositions were produced in accordance with Comparative Production Examples 1 to 6. A composition analysis of each phosphate amine salt composition of Production Examples 1 to 10 and Comparative Production Examples 1 to 6 was performed based on the area ratios (%) determined under the following analysis conditions.
   Ion chromatography: ICS-2100 (manufactured by Nippon Dionex K.K.)
   Column: DIONEX IonPac AS19 (4×250 mm)
   Eluent: aqueous potassium hydroxide solution
   Further, the concentration of ammonium cation in each phosphate amine salt composition of Production Examples 1 to 10 and Comparative Production Examples 1 to 6 was determined by the below-described analysis method.
   Ion chromatography: ICS-2000 (manufactured by Nippon Dionex K.K.)
   Column: DIONEX IonPac CS17 (4×250 mm)
   Eluent: aqueous methanesulfonic acid solution
   It is noted here that the detection limit (LOD) of this analysis method was 0.1 ppm by mass.

[Production Example 1] Production of Melamine Phosphate Composition 1

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 215 to 225° C. and a rotation speed of 800 to 1,000 rpm for 5.0 hours to perform a dehydration-condensation reaction, whereby a melamine phosphate composition 1 was obtained. The thus obtained melamine phosphate composition 1 contained 1.9% by mass of monomelamine orthophosphate, 98.0% by mass of melamine pyrophosphate, and 0.1% by mass of melamine polyphosphate in which at least three monomelamine orthophosphate molecules were condensed (provided that the amount of all phosphate amine salts was taken as 100% by mass). In addition, the melamine phosphate composition 1 contained 950 ppm of ammonium cation.

[Production Example 2] Production of Melamine Phosphate Composition 2

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 210 to 220° C. and a rotation speed of 800 to 1,000 rpm for 6.0 hours to perform a dehydration-condensation reaction, whereby a melamine phosphate composition 2 was obtained. The thus obtained melamine phosphate composition 2 contained 3.2% by mass of monomelamine orthophosphate, 96.75% by mass of melamine pyrophosphate, and 0.05% by mass of melamine polyphosphate in which at least three monomelamine orthophosphate molecules were condensed (provided that the amount of all phosphate amine salts was taken as 100% by mass). In addition, the melamine phosphate composition 2 contained 130 ppm of ammonium cation.

[Production Example 3] Production of Melamine Phosphate Composition 3

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 210 to 220° C. and a rotation speed of 800 to 1,000 rpm for 7.0 hours to perform a dehydration-condensation reaction, whereby a melamine phosphate composition 3 was obtained. The thus obtained melamine phosphate composition 3 contained 2.8% by mass of monomelamine orthophosphate, 97.1% by mass of melamine pyrophosphate, and 0.1% by mass of melamine polyphosphate in which at least three monomelamine orthophosphate molecules were condensed (provided that the amount of all phosphate amine salts was taken as 100% by mass). In addition, the melamine phosphate composition 3 contained 320 ppm of ammonium cation.

[Production Example 4] Production of Melamine Phosphate Composition 4

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 215 to 225° C. and a rotation speed of 800 to 1,000 rpm for 6.0 hours to perform a dehydration-condensation reaction, whereby a melamine phosphate composition 4 was obtained. The thus obtained melamine phosphate composition 4 contained 1.5% by mass of monomelamine orthophosphate, 98.2% by mass of melamine pyrophosphate, and 0.3% by mass of melamine polyphosphate in which at least three monomelamine orthophosphate molecules were condensed (provided that the amount of all phosphate amine salts was taken as 100% by mass). In addition, the melamine phosphate composition 4 contained 1,470 ppm of ammonium cation.

[Production Example 5] Production of Melamine Phosphate Composition 5

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 215 to 225° C. and a rotation speed of 800 to 1,000 rpm for 7.5 hours to perform a dehydration-condensation reaction, whereby a melamine phosphate composition 5 was obtained. The thus obtained melamine phosphate composition 5 contained 1.0% by mass of monomelamine orthophosphate, 98.5% by mass of melamine pyrophosphate, and 0.5% by mass of melamine polyphosphate in which at least three monomelamine orthophosphate molecules were condensed (provided that the amount of all phosphate amine salts was taken as 100% by mass). In addition, the melamine phosphate composition 5 contained 1,960 ppm of ammonium cation.

[Comparative Production Example 1] Production of Comparative Melamine Phosphate Composition 1

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 210 to 215° C. and a rotation speed of 800 to 900 rpm for 7.5 hours to perform a dehydration-condensation reaction, whereby a comparative melamine phosphate composition 1 was obtained. The thus obtained comparative melamine phosphate composition 1 contained 3.6% by mass of monomelamine orthophosphate, 96.35% by mass of melamine pyrophosphate, and 0.05% by mass of melamine polyphosphate in which at least three monomelamine orthophosphate molecules were condensed (provided that the amount of all phosphate amine salts was taken as 100% by mass). In addition, the comparative melamine phosphate composition 1 contained 50 ppm of ammonium cation.

[Comparative Production Example 2] Production of Comparative Melamine Phosphate Composition 2

Using a Henschel mixer (FM150 J/T manufactured by Mitsui Mining Co., Ltd., capacity: 150 L) that had been passed through a heat medium, 30 kg of monomelamine orthophosphate powder was stirred with heating at a temperature of 215 to 225° C. and a rotation speed of 800 to 1,000 rpm for 8.5 hours to perform a dehydration-condensation reaction, whereby a comparative melamine phosphate composition 2 was obtained. The thus obtained comparative melamine phosphate composition 2 contained 0.6% by mass of monomelamine orthophosphate, 98.6% by mass of melamine pyrophosphate, and 0.8% by mass of melamine polyphosphate in which at least three monomelamine orthophosphate molecules were condensed (provided that the amount of all phosphate amine salts was taken as 100% by mass). In addition, the comparative melamine phosphate composition 2 contained 2,120 ppm of ammonium cation.

[Comparative Production Example 3] Comparative Melamine Pyrophosphate 3

Pyrophosphoric acid and melamine were allowed to undergo a neutralization reaction in water at a temperature of 5 to 20° C., and the resulting precipitated melamine pyrophosphate was separated by filtration, washed with distilled water, and then vacuum-dried at 30° C. to obtain a comparative melamine pyrophosphate 3 in the form of powder. The thus obtained comparative melamine pyrophosphate 3 contained 100% by mass of melamine pyrophosphate (provided that the amount of all phosphate amine salts was taken as 100% by mass). In addition, the content of ammonium cation was less than the detection limit (LOD).

[Production Example 6] Production of Piperazine Phosphate Composition 6

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 235 to 245° C. and a rotation speed of 800 to 1,000 rpm for 3.0 hours to perform a dehydration-condensation reaction, whereby a piperazine phosphate composition 6 was obtained. The thus obtained piperazine phosphate composition 6 contained 1.0% by mass of monopiperazine diorthophosphate, 98.95% by mass of piperazine pyrophosphate, and 0.05% by mass of piperazine polyphosphate in which at least three monopiperazine diorthophosphate molecules were condensed (provided that the amount of all phosphate amine salts was taken as 100% by mass). In addition, the piperazine phosphate composition 6 contained 660 ppm of ammonium cation.

[Production Example 7] Production of Piperazine Phosphate Composition 7

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 230 to 240° C. and a rotation speed of 800 to 1,000 rpm for 4.0 hours to perform a dehydration-condensation reaction, whereby a piperazine phosphate composition 7 was obtained. The thus obtained piperazine phosphate composition 7 contained 2.1% by mass of monopiperazine diorthophosphate, 97.85% by mass of piperazine pyrophosphate, and 0.05% by mass of piperazine polyphosphate in which at least three monopiperazine diorthophosphate molecules were condensed (provided that the amount of all phosphate amine salts was taken as 100% by mass). In addition, the piperazine phosphate composition 7 contained 120 ppm of ammonium cation.

[Production Example 8] Production of Piperazine Phosphate Composition 8

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 230 to 240° C. and a rotation speed of 800 to 1,000 rpm for 5.0 hours to perform a dehydration-condensation reaction, whereby a piperazine phosphate composition 8 was obtained. The thus obtained piperazine phosphate composition 8 contained 1.7% by mass of monopiperazine diorthophosphate, 98.25% by mass of piperazine pyrophosphate, and 0.05% by mass of piperazine polyphosphate in which at least three monopiperazine diorthophosphate molecules were condensed (provided that the amount of all phosphate amine salts was taken as 100% by mass). In addition, the piperazine phosphate composition 8 contained 310 ppm of ammonium cation.

[Production Example 9] Production of Piperazine Phosphate Composition 9

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 235 to 245° C. and a rotation speed of 800 to 1,000 rpm for 5.0 hours to perform a dehydration-condensation reaction, whereby a piperazine phosphate composition 9 was obtained. The thus obtained piperazine phosphate composition 9 contained 0.6% by mass of monopiperazine diorthophosphate, 99.2% by mass of piperazine pyrophosphate, and 0.2% by mass of piperazine polyphosphate in which at least three monopiperazine diorthophosphate molecules were condensed (provided that the amount of all phosphate amine salts was taken as 100% by mass). In addition, the piperazine phosphate composition 9 contained 1,420 ppm of ammonium cation.

[Production Example 10] Production of Piperazine Phosphate Composition 10

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 235 to 245° C. and a rotation speed of 800 to 1,000 rpm for 6.0 hours to perform a dehydration-condensation reaction, whereby a piperazine phosphate composition 10 was obtained. The thus obtained piperazine phosphate composition 10 contained 0.4% by mass of monopiperazine diorthophosphate, 99.2% by mass of piperazine pyrophosphate, and 0.4% by mass of piperazine polyphosphate in which at least three monopiperazine diorthophosphate molecules were condensed (provided that the amount of all phosphate amine salts was taken as 100% by mass). In addition, the piperazine phosphate composition 10 contained 1,910 ppm of ammonium cation.

[Comparative Production Example 4] Production of Comparative Piperazine Phosphate Composition 4

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 230 to 235° C. and a rotation speed of 800 to 900 rpm for 5.0 hours to perform a dehydration-condensation reaction, whereby a comparative piperazine phosphate composition 4 was obtained. The thus obtained comparative piperazine phosphate composition 4 contained 2.4% by mass of monopiperazine diorthophosphate, 97.55% by mass of piperazine pyrophosphate, and 0.05% by mass of piperazine polyphosphate in which at least three monopiperazine diorthophosphate molecules were condensed (provided that the amount of all phosphate amine salts was taken as 100% by mass). In addition, the comparative piperazine phosphate composition 4 contained 40 ppm of ammonium cation.

[Comparative Production Example 5] Production of Comparative Piperazine Phosphate Composition 5

Using a Henschel mixer (FM150 J/T manufactured by Mitsui Mining Co., Ltd., capacity: 150 L) that had been passed through a heat medium, 30 kg of monopiperazine diorthophosphate powder was stirred with heating at a temperature of 240 to 250° C. and a rotation speed of 800 to 1,000 rpm for 7.0 hours to perform a dehydration-condensation reaction, whereby a comparative piperazine phosphate composition 5 was obtained. The thus obtained comparative piperazine phosphate composition 5 contained 0.3% by mass of monopiperazine diorthophosphate, 99.1% by mass of piperazine pyrophosphate, and 0.6% by mass of piperazine polyphosphate in which at least three monopiperazine diorthophosphate molecules were condensed (provided that the amount of all phosphate amine salts was taken as 100% by mass). In addition, the comparative piperazine phosphate composition 5 contained 2,170 ppm of ammonium cation.

[Comparative Production Example 6] Comparative Piperazine Pyrophosphate 6

Pyrophosphoric acid and piperazine were allowed to undergo a neutralization reaction in water at a temperature of 5 to 20° C., and the resulting precipitated piperazine pyrophosphate was separated by filtration, washed with distilled water, and then vacuum-dried at 30° C. to obtain a comparative piperazine pyrophosphate 6 in the form of powder. The thus obtained comparative piperazine pyrophosphate 6 contained 100% by mass of piperazine pyrophosphate (provided that the amount of all phosphate amine salts was taken as 100% by mass). In addition, the content of ammonium cation was less than the detection limit (LOD).

Examples 1 to 15 and Comparative Examples 1 to 9

In accordance with the respective formations shown in Tables 1 to 3, phosphate amine salt flame retardant compositions were prepared using the phosphate amine salt compositions obtained in Production Examples 1 to 10 and the comparative phosphate amine salt compositions obtained in Comparative Production Examples 1 to 6. It is noted here that Tables 1 to 3 also show the content of ammonium cation in each of the phosphate amine salt compositions. The thus obtained phosphate amine salt flame retardant compositions were tested for corrosion by the following corrosion test method. The results thereof are shown in Tables 1 to 3.
<Corrosion Test Method>
In a 100-ml glass test tube, 10 g of each phosphate amine salt flame retardant composition was placed. Further, a brass test rod of 10 mm in diameter was placed in the test tube such that the bottom half of the test rod was immersed in the phosphate amine salt flame retardant composition. The test tube was subsequently heated in a 200° C. block bath in the air. After 400 hours, the surface state of the portion of the brass test rod that had been immersed in the phosphate amine salt flame retardant composition was visually checked and evaluated as follows.

As for the evaluation, a score of 1 was given when the surface of the test rod was favorable and observed with no change. A higher evaluation score indicates further discoloration of the surface of the test rod and thus more corrosion, and a score of 5 indicates that the entire surface of the test rod turned black and the test rod thus had a poor surface state with most advanced corrosion.

Examples 1 to 15 and Comparative Examples 1 to 9

To a polypropylene resin composition obtained by blending 60 parts by mass of a polypropylene (melt flow rate=8 g/10 min) with 0.1 parts by mass of calcium stearate (lubricant), 0.1 parts by mass of tetrakis[3-(3,5-di-tert-butyl-4-hydroxyphenyl)propionic acid methyl]methane (phenolic antioxidant), 0.1 parts by mass of tris(2,4-di-tert-butylphenyl)phosphite (phosphorus-based antioxidant) and 0.3 parts by mass of glycerol monostearate (lubricant), the phosphate amine salt flame retardant compositions obtained in Production Examples 1 to 10 and Comparative Production Examples 1 to 6 were each added in the respective amounts (parts by mass) shown in Tables 1 to 3 to obtain flame-retardant synthetic resin compositions of Examples 1 to 15 and Comparative Examples 1 to 9. It is noted here that Tables 1 to 3 also show the content of ammonium cation in each of the phosphate amine salt compositions.

The thus obtained flame-retardant synthetic resin compositions were each extruded using a biaxial extruder (TEX-28, manufactured by The Japan Steel Works, Ltd.) under the conditions of 230° C. and 9 kg/hour to produce pellets, and these pellets were injection-molded at 200° C. into test pieces of 127 mm in length, 12.7 mm in width and 1.6 mm in thickness. Using the thus obtained test pieces, a UL-94V test was conducted as a flame retardancy test in accordance with the below-described test method. The results of these tests are shown in Tables 1 to 3. In addition, using the test pieces, a weather resistance test was conducted in accordance with the below-described test method. The results of these tests are also shown in Tables 1 to 3.

<Method for UL-94V Flame Retardancy Test>

The thus obtained test pieces were each held vertically, and a burner flame was brought into contact with the lower end of the test piece for 10 seconds. Subsequently, the flame was removed, and the time required for the flame ignited on the test piece to be extinguished was measured. Next, simultaneously with the flame extinction, a flame was again brought into contact with the test piece for 10 seconds, and the time required for the flame ignited on the test piece to be extinguished was measured in the same manner as in the first measurement. In addition, at the same time, it was evaluated whether or not a piece of cotton placed under the test piece was ignited by cinders falling from the test piece. Based on the first and the second combustion times, the presence or absence of ignition of the cotton piece, and the like, the condition of combustion was rated in accordance with the UL-94V standard. The combustion rating of V-0 indicates the most excellent flame retardancy, and the flame retardancy decreases in the order of V-1 and V-2, with the rating of NR representing the lowest flame retardancy.

<Method for Weather Resistance Test (Weather Discoloration Resistance Test)>

The above-obtained test pieces were each subjected to an accelerated weather resistance test using a Sunshine Weather Meter (manufactured by Suga Test Instruments Co., Ltd.) under the following conditions: with rainfall, at a black panel temperature of 63° C., for a period of up to 600 hours. The yellowness (YI) at 0 hours (initial value) and at 600 hours as well as the change in yellowness (ΔYI) were measured for each test piece. A smaller change in yellowness (ΔYI) indicates superior weather discoloration resistance.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Flame retardant composition | Melamine phosphate composition 1 | 40 | — | — | — | — | — | — | — |
| | Melamine phosphate composition 2 | — | 40 | — | — | — | — | — | — |
| | Melamine phosphate composition 3 | — | — | 40 | — | — | — | — | — |
| | Melamine phosphate composition 4 | — | — | — | 40 | — | — | — | — |
| | Melamine phosphate composition 5 | — | — | — | — | 40 | — | — | — |
| | Comparative melamine phosphate composition 1 | — | — | — | — | — | 40 | — | — |
| | Comparative melamine phosphate composition 2 | — | — | — | — | — | — | 40 | — |
| | Comparative melamine phosphate composition 3 | — | — | — | — | — | — | — | 40 |
| Content of ammonium cation (ppm by mass) | | 950 | 130 | 320 | 1,470 | 1,960 | 50 | 2,120 | LOD |
| Corrosion test | | 1 | 2 | 1 | 1 | 1 | 4 | 1 | 5 |
| Weather resistance | YI (initial value) | 2.8 | 2.8 | 2.7 | 2.9 | 2.8 | 2.8 | 2.7 | 2.7 |
| | YI (600 hours) | 3.9 | 3.6 | 3.6 | 4.1 | 4.4 | 3.4 | 6.0 | 3.3 |
| | ΔYI | 1.1 | 0.8 | 0.9 | 1.2 | 1.7 | 0.6 | 3.3 | 0.5 |
| Flame retardancy: UL-94V | | V-2 | V-2 | V-2 | V-2 | V-2 | V-2 | V-2 | V-2 |

TABLE 2

|  |  | Example 6 | Example 7 | Example 8 | Example 9 | Example 10 | Comparative Example 4 | Comparative Example 5 | Comparative Example 6 |
|---|---|---|---|---|---|---|---|---|---|
| Flame retardant composition | Piperazine phosphate composition 6 | 40 | — | — | — | — | — | — | — |
|  | Piperazine phosphate composition 7 | — | 40 | — | — | — | — | — | — |
|  | Piperazine phosphate composition 8 | — | — | 40 | — | — | — | — | — |
|  | Piperazine phosphate composition 9 | — | — | — | 40 | — | — | — | — |
|  | Piperazine phosphate composition 10 | — | — | — | — | 40 | — | — | — |
|  | Comparative piperazine phosphate composition 4 | — | — | — | — | — | 40 | — | — |
|  | Comparative piperazine phosphate composition 5 | — | — | — | — | — | — | 40 | — |
|  | Comparative piperazine phosphate composition 6 | — | — | — | — | — | — | — | 40 |
| Content of ammonium cation (ppm by mass) |  | 660 | 120 | 310 | 1,420 | 1,910 | 40 | 2,170 | LOD |
| Corrosion Test |  | 1 | 2 | 1 | 1 | 1 | 4 | 1 | 5 |
| Weather resistance | YI (initial value) | 2.7 | 2.8 | 2.8 | 2.8 | 2.9 | 2.7 | 2.8 | 2.8 |
|  | YI (600 hours) | 3.9 | 3.7 | 3.7 | 4.0 | 4.6 | 3.4 | 6.0 | 3.4 |
|  | ΔYI | 1.2 | 0.9 | 0.9 | 1.2 | 1.7 | 0.7 | 3.2 | 0.6 |
| Flame retardancy: UL-94V |  | V-2 | V-2 | V-2 | V-2 | V-2 | V-2 | V-2 | V-2 |

TABLE 3

|  |  | Example 11 | Example 12 | Example 13 | Example 14 | Example 15 | Comparative Example 7 | Comparative Example 8 | Comparative Example 9 |
|---|---|---|---|---|---|---|---|---|---|
| Flame retardant composition | Melamine phosphate composition 1 | 16 | — | — | 20 | 12 | — | — | — |
|  | Melamine phosphate composition 3 | — | 16 | — | — | — | — | — | — |
|  | Melamine phosphate composition 4 | — | — | 16 | — | — | — | — | — |
|  | Piperazine phosphate composition 6 | 24 | — | — | 20 | 28 | — | — | — |
|  | Piperazine phosphate composition 8 | — | 24 | — | — | — | — | — | — |
|  | Piperazine phosphate composition 9 | — | — | 24 | — | — | — | — | — |
|  | Comparative melamine phosphate composition 1 | — | — | — | — | — | 16 | — | — |
|  | Comparative melamine phosphate composition 2 | — | — | — | — | — | — | 16 | — |
|  | Comparative melamine phosphate composition 3 | — | — | — | — | — | — | — | 16 |
|  | Comparative piperazine phosphate composition 4 | — | — | — | — | — | 24 | — | — |
|  | Comparative piperazine phosphate composition 5 | — | — | — | — | — | — | 24 | — |
|  | Comparative piperazine phosphate composition 6 | — | — | — | — | — | — | — | 24 |
| Content of ammonium cation (ppm by mass) |  | 776 | 314 | 1,440 | 805 | 747 | 44 | 2,150 | LOD |
| Corrosion Test |  | 1 | 1 | 1 | 1 | 1 | 4 | 1 | 5 |
| Weather resistance | YI (initial value) | 2.8 | 2.7 | 2.8 | 2.8 | 2.7 | 2.8 | 2.9 | 2.7 |
|  | YI (600 hours) | 3.8 | 3.6 | 4.0 | 3.9 | 3.8 | 3.5 | 6.1 | 3.3 |
|  | ΔYI | 1.0 | 0.9 | 1.2 | 1.1 | 0.9 | 0.7 | 3.2 | 0.6 |
| Flame retardancy: UL-94V |  | V-0 | V-0 | V-0 | V-0 | V-C | V-0 | V-0 | V-0 |

From the results shown in Tables 1 to 3, it is seen that phosphate amine salt compositions which can each be used as a flame retardant that is capable of imparting excellent flame retardancy and weather resistance to synthetic resins without a risk of corroding a processing machine, as well as phosphate amine salt flame retardant compositions and flame-retardant synthetic resin compositions containing the same were obtained. According to the present invention, the respective compositions can be easily processed without corrosion of a processing machine, and molded articles having excellent weather resistance and flame retardancy can thereby be obtained.

The invention claimed is:

1. A flame-retardant synthetic resin composition, comprising a phosphate amine salt composition, comprising at least one phosphate amine salt incorporated into a polyolefin-based resin, wherein the ammonium cation content of the phosphate amine salt composition is 100 to 2000 ppm by mass, and wherein an amine in the phosphate amine salt composition is melamine or piperazine.

2. The flame-retardant synthetic resin composition according to claim 1, wherein the phosphate amine salt composition comprises a mixture of
   (A) a phosphate amine salt composition, wherein an amine in the phosphate amine salt composition (A) is melamine and
   (B) a phosphate amine salt composition, wherein an amine in the phosphate amine salt composition (B) is piperazine.

3. The flame-retardant synthetic resin composition according to claim 2, wherein the content ratio of the phosphate amine salt composition (A) and the phosphate amine salt composition (B), (A)/(B), is in a range of 20/80 to 80/20 in terms of mass ratio.

4. A molded article obtained from the flame-retardant synthetic resin composition according to claim 1.

\* \* \* \* \*